(12) United States Patent
Zheng et al.

(10) Patent No.: US 8,234,981 B2
(45) Date of Patent: Aug. 7, 2012

(54) MAGNET ARRANGEMENT FOR MAGNETIC LEVITATION VEHICLES

(75) Inventors: Qinghua Zheng, Taufkirchen (DE);
Jürgen Frantzheld, München (DE);
Friedrich Löser, Riemerling (DE)

(73) Assignee: Thyssenkrupp Transrapid GmbH, Kassel (DE)

( * ) Notice: Subject to any disclaimer, the term of this patent is extended or adjusted under 35 U.S.C. 154(b) by 382 days.

(21) Appl. No.: 12/440,804

(22) PCT Filed: Aug. 13, 2007

(86) PCT No.: PCT/DE2007/001461
§ 371 (c)(1),
(2), (4) Date: Mar. 11, 2009

(87) PCT Pub. No.: WO2008/031388
PCT Pub. Date: Mar. 20, 2008

(65) Prior Publication Data
US 2010/0037796 A1    Feb. 18, 2010

(30) Foreign Application Priority Data
Sep. 12, 2006   (DE) .................. 10 2006 043 378

(51) Int. Cl.
*B60L 13/06* (2006.01)
(52) U.S. Cl. ..................... 104/284; 104/281
(58) Field of Classification Search .............. 104/281, 104/282, 283, 284
See application file for complete search history.

(56) References Cited

U.S. PATENT DOCUMENTS

| 3,797,403 | A | * | 3/1974 | Schwarzler et al. | 104/284 |
| 3,820,470 | A | * | 6/1974 | Karch et al. | 104/293 |
| 4,636,667 | A | * | 1/1987 | Holzinger et al. | 310/13 |
| 4,698,895 | A | * | 10/1987 | Miller et al. | 29/464 |
| 4,812,757 | A | * | 3/1989 | Meins et al. | 324/207.12 |
| 4,866,380 | A | * | 9/1989 | Meins et al. | 324/207.16 |
| 5,467,718 | A | * | 11/1995 | Shibata et al. | 104/284 |
| 5,628,252 | A | * | 5/1997 | Kuznetsov | 104/284 |
| 5,764,050 | A | * | 6/1998 | Ellmann et al. | 324/207.16 |

(Continued)

FOREIGN PATENT DOCUMENTS
DE    35 16 036 A1    11/1986
(Continued)

OTHER PUBLICATIONS

ZEVrail Glasers Annalen, Oct. 2003, Special Edition "Transrapid" pp. 62 and 63.

(Continued)

*Primary Examiner* — S. Joseph Morano
*Assistant Examiner* — Jason C Smith
(74) *Attorney, Agent, or Firm* — McGlew and Tuttle, P.C.

(57) ABSTRACT

A magnetic polar arrangement which is intended for magnetic levitation vehicles is described, the magnetic polar arrangement having at least one magnetic pole (22) with a core (6) which defines a magnetic pole surface (23), and with a winding (5) which is set back with respect to the magnetic pole surface (23) in order to form a free space (24). The magnetic pole (22) is provided with a sensor which contains a sensor head (9*a*), which is arranged at least partially in the free space (24), and an electronic module (9*b*). According to the invention the sensor head (9*a*) is physically separated from the electronic module (9*b*) and is combined, at least with the core (6), to form a single-piece structural unit which is surrounded by a common anti-corrosion layer (26).

12 Claims, 4 Drawing Sheets

U.S. PATENT DOCUMENTS

| | | | |
|---|---|---|---|
| 6,357,359 B1* | 3/2002 | Davey et al. | 104/282 |
| 6,450,103 B2* | 9/2002 | Svensson | 104/120 |
| 6,568,332 B1* | 5/2003 | Holzinger et al. | 104/281 |
| 6,601,519 B1* | 8/2003 | Bindloss et al. | 104/284 |
| 6,827,022 B2* | 12/2004 | van den Bergh et al. | 104/284 |
| 7,380,508 B2* | 6/2008 | Li | 104/284 |
| 7,814,840 B2* | 10/2010 | Becker et al. | 104/281 |
| 2001/0001895 A1* | 5/2001 | Setiabudi et al. | 29/609 |
| 2004/0123766 A1* | 7/2004 | van den Bergh et al. | 104/281 |
| 2005/0012028 A1* | 1/2005 | Weaver et al. | 250/208.2 |
| 2006/0096495 A1* | 5/2006 | Fischperer | 104/281 |
| 2006/0097116 A1* | 5/2006 | Fischperer | 246/468 |
| 2006/0130699 A1* | 6/2006 | Thornton et al. | 104/284 |
| 2006/0219128 A1* | 10/2006 | Li | 104/284 |
| 2007/0095245 A1* | 5/2007 | Li | 104/284 |
| 2007/0131134 A1* | 6/2007 | Post | 104/284 |
| 2007/0169661 A1* | 7/2007 | Hahn et al. | 104/281 |
| 2007/0169662 A1* | 7/2007 | Ellmann et al. | 104/282 |
| 2008/0252405 A1* | 10/2008 | Becker et al. | 335/291 |
| 2008/0257197 A1* | 10/2008 | Hahn et al. | 104/282 |
| 2009/0050751 A1* | 2/2009 | Zheng et al. | 246/122 R |
| 2010/0037796 A1* | 2/2010 | Zheng et al. | 104/284 |

FOREIGN PATENT DOCUMENTS

| | | |
|---|---|---|
| DE | WO 2005/090115 | 9/2005 |
| DE | 102004012748 A1 | 10/2005 |
| DE | 102004013692 A1 | 10/2005 |
| EP | 0 753 718 A2 | 1/1997 |

OTHER PUBLICATIONS

Bitta A. et al.: "A new approach to the levitation control of an electromagnetic suspension vehicle", Control Applications, 1998, Proceedings of the 1998 IEEE International Conference on Trieste, Italy, Sep. 1-4, 1998, New York, NY, USA, IEEE, U.S. vol. 1, Sep. 1, 1998, pp. 263-267, XP010307267 ISBN: 0-7803-4104-X.

* cited by examiner

MAGNET ARRANGEMENT FOR MAGNETIC LEVITATION VEHICLES

CROSS REFERENCE TO RELATED APPLICATIONS

This application is a United States National Phase application of International Application PCT/DE2007/001461 and claims the benefit of priority under 35 U.S.C. §119 of German Patent Application DE 10 2006 043 378.5 filed Mar. 12, 2006, the entire contents of which are incorporated herein by reference.

FIELD OF THE INVENTION

The present invention pertains to a magnet arrangement for magnetic levitation vehicles, the arrangement including at least one magnet pole having a core defining a magnet pole face and having a winding.

BACKGROUND OF THE INVENTION

Prior art magnet arrangements of this species have at least one sensor which serves to determine the distance from a magnet pole surface to a conductive reaction rail for the magnetic levitation vehicle and to control the magnitude of the gap between the magnet pole surface and the reaction rail (e.g. DE 35 16 036 C2, EP 0 753 718 B1 (an corresponding U.S. Pat. No. 5,764,050).

The reaction rail, for example, is a longstator comprised of a plurality of stator packets arranged one behind the other and being part of a longstator linear motor for the magnetic levitation vehicle. Sensors for such magnet arrangements generally comprise one sensor head provided with at least one measuring and/or sensor coil and an electronic module which is assigned to the sensor head and which contains switching circuits, for example, that serve to generate, process and/or evaluate sensor signals and which is connected to a usual control circuit with a control element and a magnet current actuator in order to maintain the magnitude of the gap between the magnet pole face and the reaction rail to a preselected design value of 10 mm, for example.

The sensor heads of the sensors described are always next to a selected magnet pole and so arranged that they border at the same plane as its magnet pole face. In practice, the sensor heads with the assigned electronic modules form one L-shaped structural unit, with the sensor head being arranged in a space next to the magnet pole kept free from its magnet coil, and wherein the electronic module comes to rest at the front side of the magnet arrangement facing the guideway (e.g. DE 2004 012 748 A1 or ZEVrail Glasers Annalen, October 2003, special edition "Transrapid" P. 62, 63). Though a sensor of this layout and arrangement works faultless, it does not meet all the desired requirements.

For example, it is deemed disadvantageous that the sensor together with the assigned magnet pole moves during the operation of a magnetic levitation vehicle and that is therefore exposed to high mechanical loads. These loads might take an adverse effect on the electronic module and on the control of the gap. Though in most cases there are two sensors of this kind for reasons of redundancy, but a failure of electronic components should be avoided, if possible, because a safe control of the gap size constitutes an indispensable prerequisite for the levitation status and thus for the operation of a magnetic levitation vehicle.

Another disadvantage of prior art magnet arrangements results from the fact that the surface of the sensor head should be arranged exactly flush to the magnet pole face whose gap versus the reaction rail is monitored. This calls for a sophisticated fastening technique and therefore, apart from leading to an increase in the number of components, it also leads to a reduction in the failsafe operation of the sensor.

SUMMARY OF THE INVENTION

Now, therefore, the technical problem underlying the present invention is to configure the magnet arrangement of the afore-mentioned species in such a manner that the deficiencies outlined hereinabove are largely or entirely avoided.

According to the invention, a magnet arrangement is provided for magnetic levitation vehicles. The magnet arrangement is comprised of at least one magnet pole having a core defining a magnet pole face and having a winding set back versus the magnet pole face to create a free space and comprised of at least one sensor to determine the distance of the magnet pole face from a reaction rail for the magnetic levitation vehicle. The sensor is comprised of a sensor head at least partly arranged in the free space, and an electronic module. The sensor head is physically separated from the electronic module and combined with the core to form a single-piece structural unit with the core, the single-piece structural unit being surrounded by a common anti-corrosion layer.

The present invention bears the advantage in that the sensor head is integrated into the magnet arrangement and constitutes a firm part of it. Thereby, sophisticated measures for assembly and adjustment of the sensor head are rendered superfluous on the one hand, and on the other hand there is no risk that the sensor head might get loose on operation of the magnetic levitation vehicle and thus falsify the gap signal. Moreover, the separation of the electronic modules from the sensor heads leads to the possibility of supporting the electronic modules resiliently at the magnet arrangement, if required, or to mount these at a location remote from the magnet arrangement in such a manner that they need not join in the movements of the magnet poles. In both cases, the electronic modules are protected from subsequent damage due to mechanical impacts or the like which substantially enhances the failsafe operation of the sensor.

Advantageously the sensor head with the core and the winding may be combined to form the structural unit.

The arrangement may advantageously include adjacent magnet poles facing each other (adjacent to each other) with free spaces of one core facing a next core and the sensor head arranged by half in an adjacent free space.

The sensor head may be comprised of at least two parts which are arranged on different sides of a core associated to the same magnet pole.

The electronic module may be resiliently supported.

The invention is explained in greater detail herein-below in conjunction with the attached drawings by means of exemplary embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
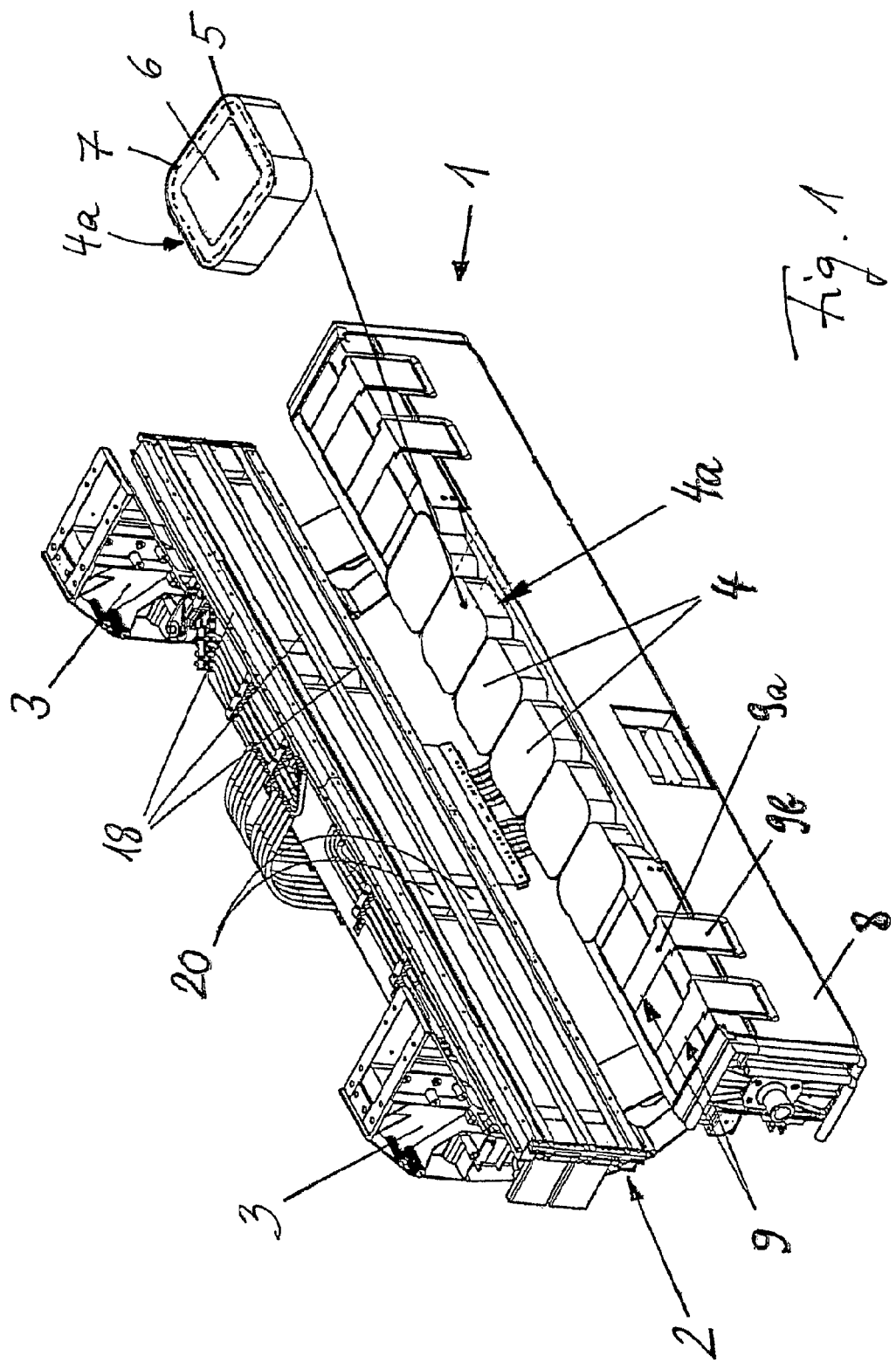
FIG. 1 is a schematic, perspective view of a known module of a magnetic levitation vehicle, said module being comprised of two magnet arrangements.

Referring to the drawings in particular, FIG. 1 schematically shows a module utilized for magnetic levitation vehicles with a first magnet arrangement 1 in form of carrier magnets and with a second magnet arrangement 2 in form of a guiding magnet. The module is fastened to rack stirrups 3, which in actually known manner are connected to a levitation rack or the like of a wagon box of the magnetic levitation vehicle.

In the embodiment example, the magnet arrangement 1 for the "carrying" function is comprised of twelve magnet poles 4 arranged one behind the other, whose windings 5 and cores 6 which are preferably electrically connected group-wise in series, as is shown in an enhanced view in FIG. 1 for a magnet pole 4a, are usually surrounded all-around by an anti-corrosion layer 7 comprised of epoxy resin, for example. The cores 6 are connected to each other by pole backs not shown here and firmly connected to a magnet back box 8 by pole cheeks not shown here and arranged one behind the other in a longitudinal direction of the magnet arrangement 1 which in built-in status generally corresponds to the longitudinal and traveling direction of the magnetic levitation vehicle.

Figure 2:
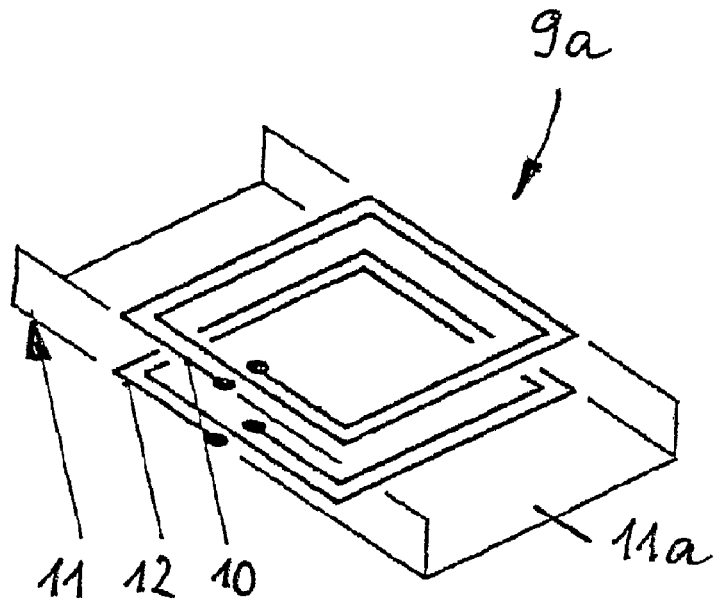
FIG. 2 is a schematic and perspective view of a sensor head of the magnet arrangement according to FIG. 1.
Figure 3:
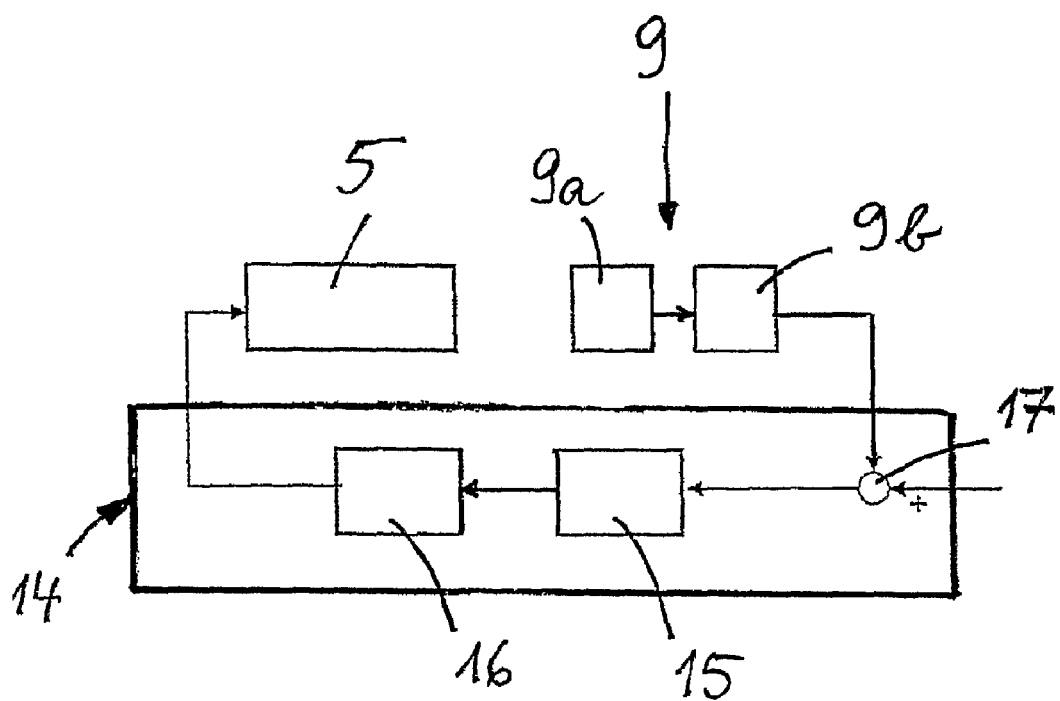
FIG. 3 is an electronic module of the sensor with a successive control circuit for a magnet pole of the magnet arrangement according to FIG. 1.

At least one sensor 9 per group of magnet poles 4 (FIG. 1) with a sensor head 9a shown in FIG. 2 and an electronic module 9b shown in FIG. 3 serves to control the flow of current through the windings 5 in such a manner that the magnitude of a gap between magnet poles 4 and a reaction rail not shown here, e.g. a longstator, remains constant during the operation of a magnetic levitation vehicle. As shown in FIG. 1, the known sensor 9 is comprised of a single-piece L-shaped structural unit, with the sensor head 9a being arranged between two adjacent magnet poles 4, while the electronic module 9b lies at the front side of the magnet arrangement 1.

In accordance with FIG. 1, the sensor head 9a, for example, is comprised of at least one sensor and/or measuring coil 10 which is arranged in the aperture plane of a casing 11 that is open towards the reaction rail and conductive (metallic). Additionally, the sensor head 9a can be provided with at least another coil 12, which for example faces a bottom 11a of casing 11 and which is arranged between it and the sensor coil 10.

In a simplified representation, FIG. 3 shows the electronic module 9b which is arranged in a casing not shown here in greater detail. To generate, process and/or evaluate sensor signals, module 9b is comprised of certain switching circuits and connected to a control circuit 14 for the assigned group of magnet poles. For example, this control circuit is comprised of a control element 15, a magnet current actuator 16 and a comparator 17. The comparator 17 is connected to the output of the electronic module 9b and to a setpoint transmitter, supplying in an actually known manner a signal at the output connected to control element 15 that is proportional to the difference from the actual gap magnitude (actual value) and a fixed or adapted setpoint value. The control element 15 hereof determines an actuator signal for the magnet current actuator 16 which in turn controls the current through the winding 5 of the relevant magnet pole and/or through the windings of the relevant magnet pole group in such a manner that the gap assumes an essentially constant magnitude and maintains it during the travel of the magnetic levitation vehicle.

While FIGS. 2 and 3 show the components of a sensor 9, FIG. 1 shows that the magnet arrangement 1 is comprised of two such sensors 9 each, preferably at each end. Thereby it is possible to redundantly control the gap magnitude at each end of the magnet arrangement 9. With the known arrangement (FIG. 1), the sensor heads 9a and electronic modules 9b each are combined to form a single-piece structural unit which is connected to the magnet arrangement in a manner not shown here and which must be aligned to the magnet pole faces.

With regard to the number, configuration, and arrangement of magnet poles 18 (FIG. 1), the magnet arrangement 2 for the "guiding" function can be configured differently to the magnet arrangement 1. However, the magnet poles 18, too, are provided with sensors 20 which expediently are configured and arranged in principle like the sensors 9 and which serve the purpose of determining the gap between magnet poles 18 and a reaction rail in form of a lateral guide rail. Sensors 20, too, are comprised of sensor heads and electronic modules so that reference can be made to FIGS. 2 and 3 in this regard.

Magnet arrangements, gap sensors and control circuits of the kind described hereinabove are generally known from the printed publications mentioned above which by reference to them are hereby made a subject matter of the present disclosure in order to avoid repetitions (DE 35 16 036 C2, EP 0 753 718 B1, U.S. Pat. No. 5,764,050 and DE 2004 012 748 are incorporate by reference).

Figure 4:
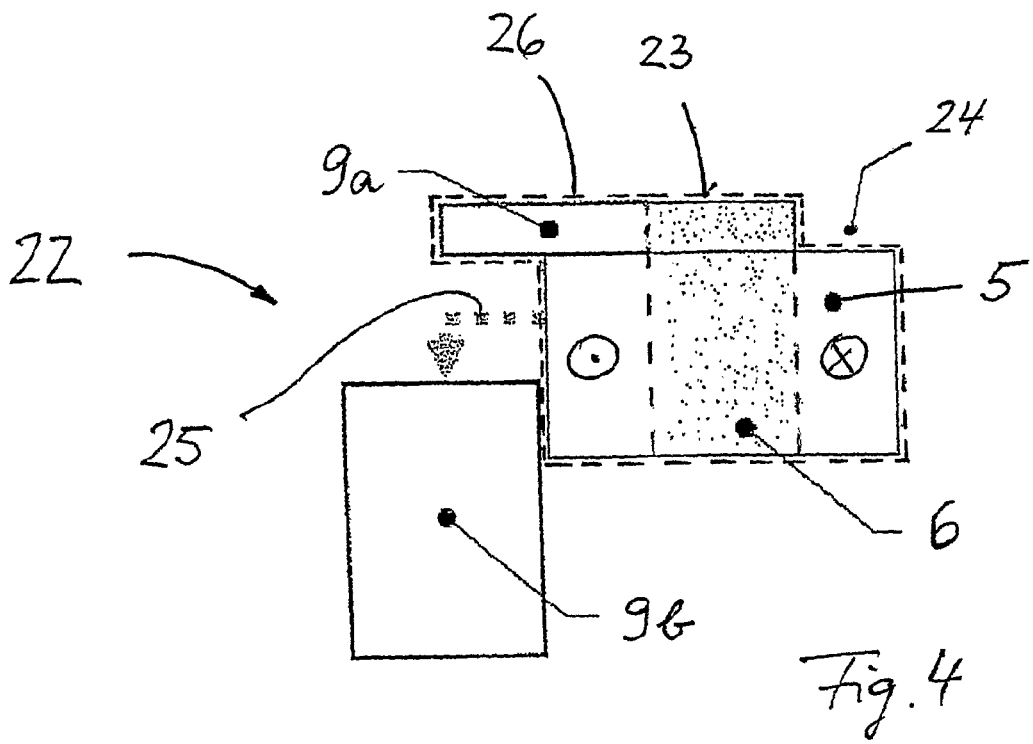
FIG. 4 is the front view of a magnet arrangement with a unique magnet pole and an inventive sensor assigned to it according to the invention.
Figure 5:
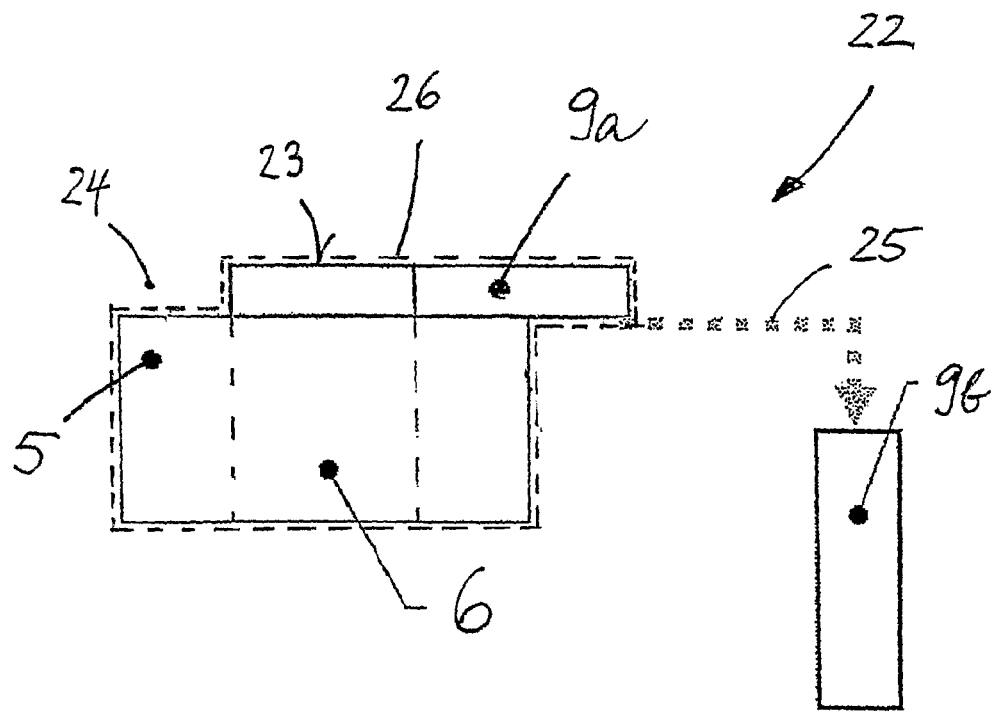
FIG. 5 is a side view of the magnet arrangement according to FIG. 4.

FIGS. 4 and 5 show a first and currently considered best example of an embodiment of the present invention based on a magnet arrangement with a single magnet pole 22. Like in FIG. 1, it is comprised of a core with magnet pole face 23 facing the reaction rail and a winding 5 surrounding the core 6. The winding 5 is set back versus the magnet pole face 23, i.e. it terminates in a plane lying beneath the magnet pole face 23 so that a free space 24 surrounding the core 6 is created between it and the plane formed by magnet pole face 23.

The free space 24 serves to accommodate at least partly a sensor head 9a configured according to FIG. 2, for example. In the special case of FIG. 4 (side view), the sensor head 9a lies by roughly its half in the free space 24, while it rises with its other half laterally over the winding 5. Furthermore, in contrast with FIG. 2, the sensor head 9a is physically separated from the electronic module 9b and electrically connected to it only by an electrical connector cable 25. Thereby it is possible to mount the electronic module 9b regardless of the position of sensor head 9a virtually at any point of the magnet arrangement and particularly in such a manner that it needs not join in the movements of the magnet pole 22 during the operation of the magnetic levitation vehicle. Alternatively it is possible to support the electronic module 9b by the aid of a suitable spring assembly at the magnet pole 22 or magnet back box 8 (FIG. 1) so as to largely protect it from abrupt movements. Thereby it is ensured that the service life of the electrical components contained in it is not restricted by constant mechanical movements. Moreover it gives the advantage that the relative position of the electronic module 9b versus magnet pole 22 is non-critical, i.e. it does not call for any adjustment work. Finally, the electronic module 9b, when arranged separately from magnet pole 22, can also be combined with other electrical components.

According to the present invention, the sensor head 9a is integrated into magnet pole 22 and combined with it to form a single-piece structural unit. This is accomplished by surrounding at least the core 6 and sensor head 9a, but preferably also the winding 5 after their joining as shown in FIG. 4. with a common anti-corrosion layer 26 which is indicatively shown by a dashed line in FIGS. 4 and 5. It gives the advantage that the sensor head 9a needs to be aligned exactly to the magnet pole face 23 only once during the production of the magnet pole 22 and maintains its relative position to the magnet pole face 23 after grouting with an epoxy resin compound or the like. Furthermore, it is thereby achieved that the sensor head 9a after the correct mounting of magnet pole 22 in or at the magnet back box 8 automatically takes its correct position in relation to the magnet pole face 23, i.e. difficult adjustment and fastening work to be performed subsequently for the sensor head 9a, too, are entirely avoided.

As shown in FIG. 5, the sensor head 9a also rises slightly towards the front above the winding 5 of magnet pole 22. This gives the possibility of leading the connector cable 25 without any obstacle towards the bottom out from sensor head 9a. Alternatively it would also be possible to let the sensor head 9a terminate flush towards the front with the outside of core 6. The dimensioning of sensor head 9a taken in an individual case particularly depends on the space available and on what size of an area of the exemplarily shown measuring coil is to be covered in order to generate a sufficiently strong measuring signal.

Wrapping of magnet poles of the kind being of interest here with an anti-corrosion layer is known in principle (e.g. DE 197 03 497 A1). For the purpose of the present invention, the prior art method can be applied analogously by positioning the sensor head 9a before inserting the magnet pole 22 into the casting tool in the required manner, possibly by applying appropriate positioning means.

Figure 6:
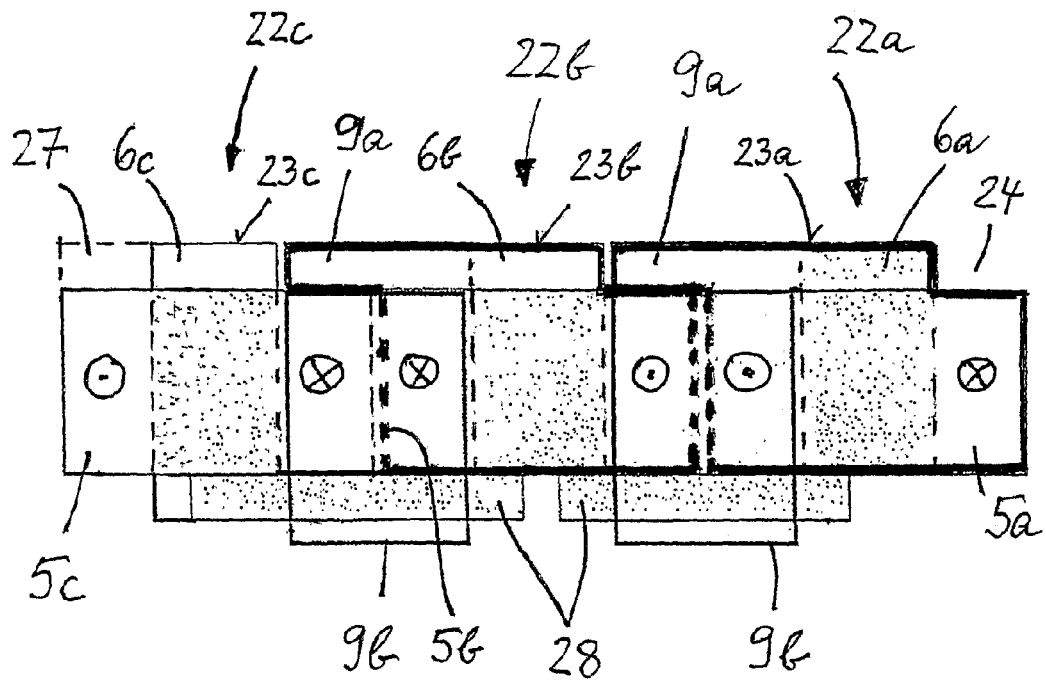
FIG. 6 is a view corresponding to those shown in FIGS. 4 and 5 of a magnet arrangement with three magnet poles arranged side by side and two inventive sensors assigned to them.
Figure 7:
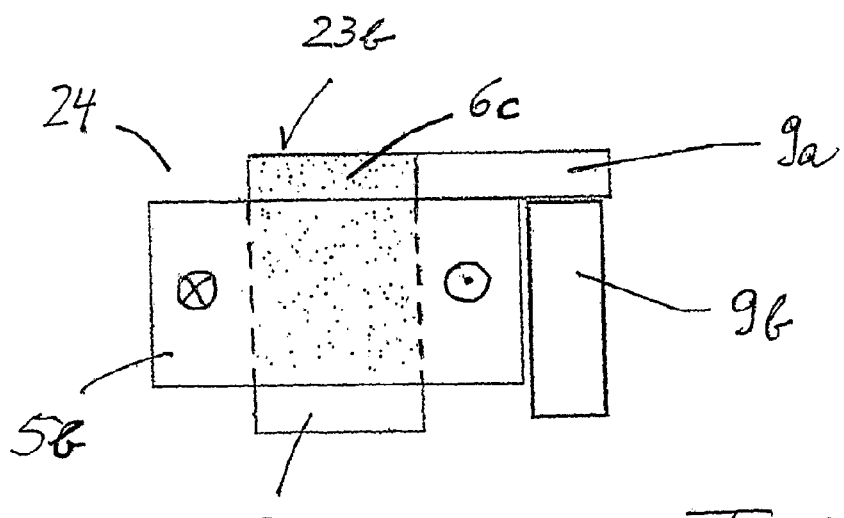
FIG. 7 is a view corresponding to those shown in FIGS. 4 and 5 of a magnet arrangement with electronic module arranged immediately beneath the relevant sensor head and physically separated therefrom.

FIGS. 6 and 7 show a second example of an embodiment of the present invention based on a magnet arrangement comprised of three magnet poles 22a, 22b, and 22c, with equal parts being designated with the same references as in FIGS. 4 and 5 and additionally designated with the letters "a", "b", and "c", and wherein hidden lines are represented in dashed style.

From FIG. 6 it becomes evident that the magnet pole 22a, comprised of a core 6a, a winding 5a, and a sensor head 9a is configured in the same manner as the magnet pole 22 according to FIG. 4. In FIG. 6, The part of the sensor head 9a shown in FIG. 4 and rising by half over the winding 5 (towards the left side) lies in a free space of the adjacent magnet pole 22b of the magnet arrangement following towards the left side, corresponding to the free space 24 and facing the magnet pole 22a. A connection of this part of the sensor head 9a with magnet pole 22b is not necessary because the sensor head 9a is firmly connected to magnet pole 22a and because both magnet poles 22a, 22b are mounted position-exactly in magnet back box 8 (FIG. 1). Moreover, FIG. 6 shows that magnet pole 22b comprised of a core 6b, a winding 5b, and another sensor head 9a is configured identically to magnet pole 22a. To elucidate it, the peripheral lines of both magnet poles 22a, 22b are drawn in lines thicker than those of the other parts. Thus it becomes evident that the sensor head 9a of the magnet pole 22b also rises (towards the left side) over the winding 5b so that another magnet pole could be connected towards the left side with an appropriately staggered modular construction.

To avoid any uncertainty, the anti-corrosion layers 26, which surround the components 5a, 6a, and 9b on the one hand and the components 5b, 6b, and 9a on the other hand, connecting them to a firm, uniform structural unit are not shown in FIGS. 6 and 7.

As one can see from FIG. 1, the arrangement according to FIG. 6 in principle represents the situation resulting when applying the invention at the right end of a magnet arrangement comprised of twelve magnet poles 4. Therefore, if further magnet poles (e.g. 22c) having no sensors 9 are to follow next to magnet pole 22b in FIG. 6 towards the left side by analogy to FIG. 1, then the free space remaining at the far left side in FIG. 6 of the next following magnet pole 22c is expediently provided with a filling piece 27 extending to the relevant magnet pole face 23c and indicatively shown in dashed lines, said filler piece being comprised of a magnetically neutral material. Then magnet poles following next and not shown in FIG. 6 would be comprised of one winding each which towards the top roughly extends up to the relevant magnet pole face, because no free spaces 24 are needed any longer for these magnet poles. In this case, the filling piece 27 bridges a step created between magnet pole 22c and the successive magnet pole.

Corresponding sensors can be provided at the left end of the magnet arrangement shown in FIG. 1 in a manner that their sensor heads 9a, for example, protrude towards the right side beyond the assigned windings.

The sensors according to FIG. 6 are expediently comprised of electronic modules 9b individually assigned to them and arranged on the front side of the relevant magnet arrangement and overlapping parts of the windings of two adjacent magnet poles 22a, 22b and/or 22b, 22c facing each other. Though according to FIG. 7, which by analogy to FIG. 5 shows a side view of a unique magnet pole 23b, the electronic modules 9b are arranged immediately beneath the relevant sensor head 9a, they are physically separated from sensor heads 9a as shown in FIGS. 4 and 5 and electrically connected to them only by a connector cable not shown here. With this example of an embodiment, too, the electronic modules 9b can therefore be resiliently supported without thus adversely affecting the function of sensor heads 9a.

The invention is limited to the embodiments described hereinabove that can be modified in a plurality of ways. In particular, it becomes evident from the drawings that the number of magnet poles per magnet arrangement can be varied within wide limits. In addition to the at least one magnet pole 22 provided with a sensor 9, there may be further magnet poles 22b, 22c with or without sensors. The number of those magnet poles within a magnet arrangement, too, which is provided with a sensor can be chosen differently depending on an individual case. These may be both magnet arrangements for the "carrying" function and those for the "guiding" function. Furthermore it is obvious that the sensor heads 9a in contrast with FIGS. 4 and 7 need not be comprised of a unique part that is inserted into the free spaces of two adjacent magnet poles facing each other (FIG. 6), but that they might also be comprised of two or more electrically connected parts, whereof for example one is arranged in the free space 24 at the left side of core 6 (and/or behind it) and the other in the free space 24 at the right side of core 6 (and/or behind it) as shown in FIG. 4. In this case, the sensor head 9*a* would preferably terminate entirely flush all around with the outer shell face of the relevant winding 5. An arrangement of sensor parts upstream to or downstream of core 6, however, in general is only purposive if the reaction rails co-acting with cores 6 protrude accordingly towards the front or rear end beyond cores 6. Furthermore, it is obvious that the magnet arrangement described hereinabove is provided with additional structural elements, if required. For example, this includes but is not limited to usual magnet backs 28 (FIGS. 6 and 7), which magnetically connect adjacent cores 6*a*, 6*b* and/or 6*b*, 6*c* at their undersides, and or windings of linear generators sunk into the magnet pole faces 23 and serving to generate current. Finally it is self-evident that the different parts can also be applied in combinations other than those described and outlined hereinabove.

While specific embodiments of the invention have been shown and described in detail to illustrate the application of the principles of the invention, it will be understood that the invention may be embodied otherwise without departing from such principles.

The invention claimed is:

1. A magnet arrangement for magnetic levitation vehicles, the magnet arrangement comprising:
   at least one magnet pole having a core defining a magnet pole face and having a winding set back relative to the magnet pole face to create a free space;
   at least one sensor for determining a distance of the magnet pole face from a reaction rail for the magnetic levitation vehicle, said sensor being comprised of a sensor head at least partly arranged in the free space, and an electronic module, said sensor head being physically separated from said electronic module and said sensor head being physically combined with said core to form a single-piece structural unit; and
   an anti-corrosion layer, said single-piece structural unit being surrounded by said anti-corrosion layer as a common anti-corrosion layer.

2. A magnet arrangement as defined in claim 1, wherein the sensor head with the core and the winding are combined to form the structural unit.

3. A magnet arrangement as defined in claim 1, wherein said single-piece structural unit is connected to another said single-piece structural unit to provide two adjacent magnet poles and one said sensor head, of said another said single-piece structural unit, is arranged with a portion thereof in at least a portion of the remaining free space of said single-piece structural unit.

4. A magnet arrangement as defined in claim 1, the sensor head is comprised of at least two parts which are arranged on different sides of a core associated to the same magnet pole.

5. A magnet arrangement as defined claim 1, the electronic module is resiliently supported.

6. A magnet arrangement as defined in claim 1, wherein the winding is combined with said sensor head and said core to form said structural unit.

7. A magnet arrangement as defined claim 6, further comprising:
   another structural unit with another magnet pole comprising another core and another winding set back relative to another magnet pole face to create another free space and comprising another magnet pole face to magnetic levitation vehicle reaction rail distance sensor comprising another sensor head with a portion of said another sensor head arranged in a portion of said another free space and another electronic module physically separated from said another sensor head, said another sensor head being physically combined with said another core and said another winding to form said another structural unit as a single-piece with said another structural unit surrounded by another common anti-corrosion layer, wherein:
   said single-piece structural unit is connected to said another structural unit with a portion of said sensor head not arranged in said portion of said free space arranged in a portion of said another free space to provide two adjacent magnet poles.

8. A magnet arrangement as defined claim 7, further comprising:
   a further structural unit with a further magnet pole comprising a further core and a further winding set back relative to a further magnet pole face to create a further free space and comprising a further magnet pole face to magnetic levitation vehicle reaction rail distance sensor comprising a further sensor head with a portion of said a further sensor head arranged in a portion of said further free space and a further electronic module physically separated from said further sensor head, said further sensor head being physically combined with said further core and said further winding to form said further structural unit as a single-piece with said further structural unit surrounded by a further common anti-corrosion layer, wherein:
   said another structural unit is connected to said further structural unit with a portion of said another sensor head not arranged in said portion of said another free space arranged in a portion of said further free space to provide three adjacent magnet poles.

9. A magnet arrangement according to claim 8, further comprising: a magnet back box supporting said three adjacent magnet poles, said electronic module being resiliently supported by said magnet back box.

10. A magnet arrangement for magnetic levitation vehicles, the magnet arrangement comprising:
    a magnet pole comprising a core, defining a magnet pole face, and a winding, set back relative to the magnet pole face to create a free space;
    a magnet pole face to magnetic levitation vehicle reaction rail distance sensor comprising a sensor head with a portion of said sensor head arranged in a portion of said free space and an electronic module physically separated from said sensor head, said sensor head being physically combined with said core to form a single-piece structural unit; and
    an anti-corrosion layer, said single-piece structural unit being surrounded by said anti-corrosion layer as a common anti-corrosion layer.

11. A magnet arrangement according to claim 10, further comprising: a magnet back box supporting said structural unit, said electronic module being resiliently supported by said magnet back box.

12. A magnet arrangement as defined in claim 11, wherein said electronic module is electrically connected to said sensor head via a connector cable.

* * * * *